United States Patent [19]
Osborn

[11] Patent Number: 5,402,870
[45] Date of Patent: Apr. 4, 1995

[54] VEHICLE PARK/LOCK MECHANISM

[75] Inventor: Charles Osborn, Spring Lake, Mich.

[73] Assignee: Grand Haven Stamped Products, Div. of JSJ Corporation, Grand Haven, Mich.

[21] Appl. No.: 63,241

[22] Filed: May 18, 1993

[51] Int. Cl.$^6$ ............................................. B60K 41/26
[52] U.S. Cl. .................................... 192/4 A; 74/475; 74/483 R
[58] Field of Search ............. 192/4 A; 74/475, 483 R, 74/527, 520; 70/245, 247, 248; 180/271

[56] References Cited

U.S. PATENT DOCUMENTS

| | | |
|---|---|---|
| 2,890,581 | 6/1959 | Lewis . |
| 3,939,940 | 2/1976 | Sasabe et al. . |
| 4,246,989 | 1/1981 | Kohler ................................... 192/4 A |
| 4,880,092 | 11/1989 | Kito et al. . |
| 4,930,609 | 6/1990 | Bois et al. . |
| 4,966,262 | 10/1990 | Mieczkowski . |
| 5,018,610 | 5/1991 | Rolinski et al. . |
| 5,096,033 | 3/1992 | Osborn ................................... 192/4 A |
| 5,129,494 | 7/1992 | Rolinski et al. . |
| 5,167,308 | 12/1992 | Osborn . |
| 5,181,592 | 1/1993 | Pattock . |
| 5,211,127 | 5/1993 | Osborn et al. . |

FOREIGN PATENT DOCUMENTS

| | | |
|---|---|---|
| 1203756 | 4/1986 | Canada . |
| 0246353 | 11/1987 | European Pat. Off. . |
| 59-176253 | 11/1984 | Japan . |
| 60-23427 | 2/1985 | Japan . |
| 4-60270 | 2/1992 | Japan ................................... 192/4 A |

Primary Examiner—Richard M. Lorence
Attorney, Agent, or Firm—Price, Heneveld, Cooper, DeWitt & Litton

[57] ABSTRACT

A vehicle transmission shifter in which a locking member is movable along a line in opposite directions to a locked position or unlocked position. A mechanical advantage means, preferably a toggle joint, is connected to one end of the locking member for either restraining or moving the locking member in response to the energization of an electrical coil of an electrical module which actuates an armature, or so-called module actuator, in a direction orthogonal to the toggle joint. The module actuator is biased to substantially align the axes of the toggle joint in which position the locking member is in locked position restrained from movement. When the brake of the vehicle is applied, the coil is energized and the module actuator is moved by the energization of the coil to break the knee of the toggle joint to unlock the locking member.

36 Claims, 4 Drawing Sheets

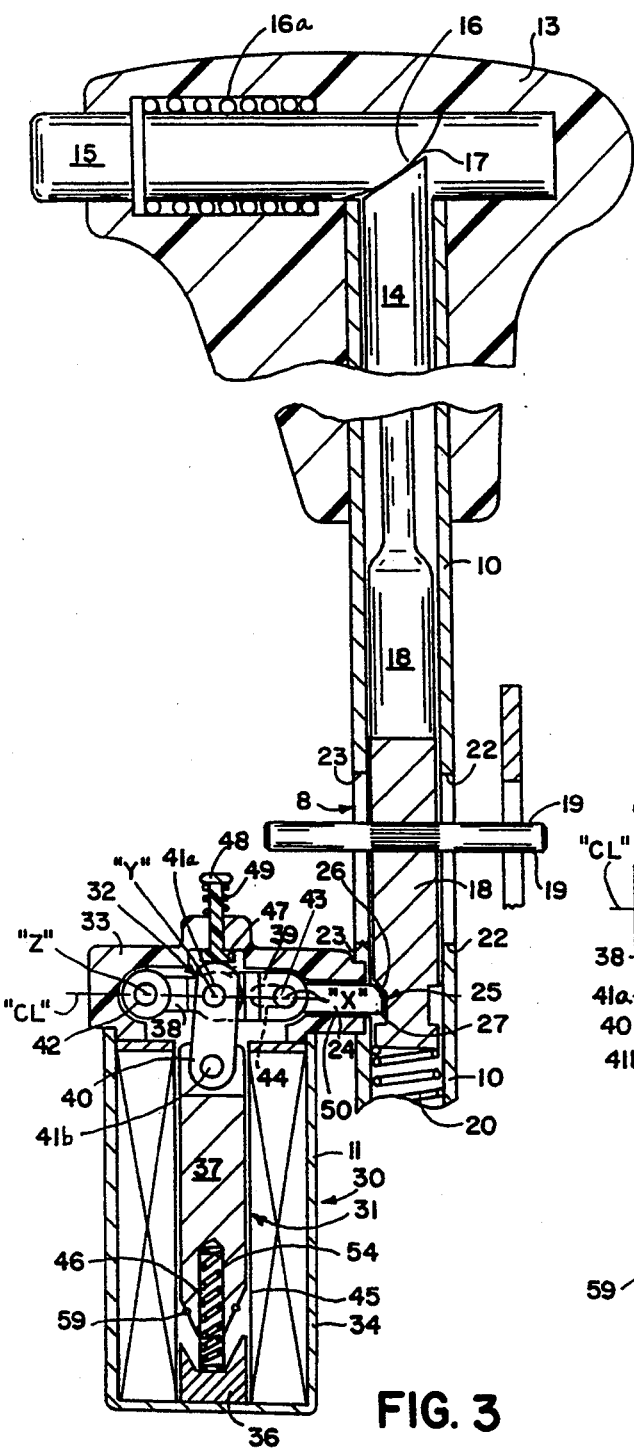
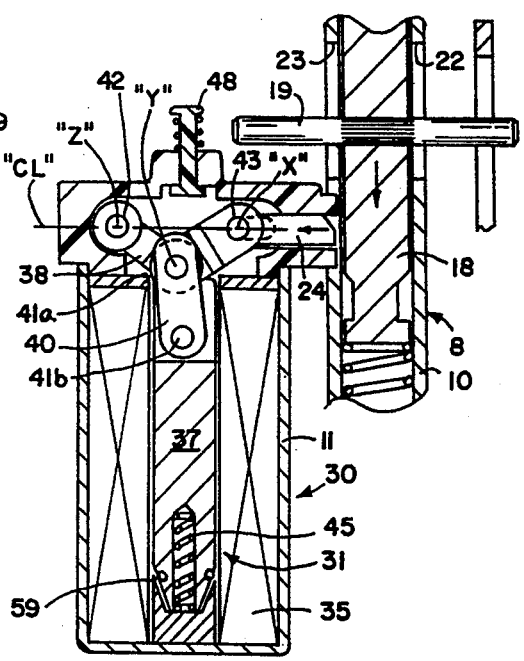
FIG. 3
FIG. 4

VEHICLE PARK/LOCK MECHANISM

This invention relates generally to a locking mechanism for controlling the shifting of a lever for an automatic transmission, and more particularly, for such locking mechanism for locking the shift lever in a park position against rotation to other gear positions. More specifically, this invention relates to a locking mechanism which is responsive to a condition of a vehicle such as the application of the brakes of an automotive vehicle.

BACKGROUND OF THE INVENTION

In vehicles which are equipped with automatic transmissions, the shifting lever is movable from a park position to other gear positions such as reverse, neutral, drive, second gear, and first gear. The shifting lever is generally associated with a detent plate and a detent pawl for releasably holding the lever in the park position and an actuator means as provided for the driver to actuate the pawl to release the shifting lever for movement by the driver to the other gear positions.

In my U.S. Pat No. 5,096,033, issued on Mar. 17, 1992, I explained the problems that have been encountered in the unintended acceleration of a vehicle in shifting from the park position to the other gear positions. Therefore, efforts have been made to prevent the shifting of the shifting lever until the brake pedal had been depressed so that the vehicle does not move before it is intended by the driver.

My U.S. Pat. No. 5,096,033 discloses an electrically operated control module mounted on a detent plate and having a pin movable between a distended position to an extended position. This control module is controlled by the application or nonapplication of the brakes of the vehicle ill which the shifter is mounted. When the brakes are not applied, the pin is urged to all extended position which prevents a lockout arm from being moved by the actuation of the pawl actuator and, accordingly, the pin when extended prevents the shifting of the shift lever. However, when the pin is distended by applying the brakes, it is located out of the path of the lockout arm permitting the actuation of the pawl and the shifting of the shift lever from park position to the other gear positions.

Many other types of lockout mechanisms have been devised. One such suggested mechanism was to mount an electrically operated control module having a pin movable between a distended position to an extended position on the tube of a shifter lever. In such mechanism, the pin was movable in response to the energization of the coil of the module to an extended position and into the path of a pawl actuator. The pin actually was an armature forced by the magnetic field of the coil into a notch formed in the side of the pawl actuator locking the pawl actuator against movement by the driver. Both the pin and the notch included angled sides which engaged each other so that when the coil was not energized, the pin was cammed out of the way of the pawl actuator permitting the driver to move the pawl out of the park/lock position. In this proposed design, the axial center of the coil of the module and the pin extended along an axis perpendicular to the pawl actuator and the pin was held in the notch of the pawl actuator by a magnetic force and was withdrawn from the notch by a spring. This arrangement resulted in a temporary binding force between the pawl actuator and pin which gave an undesirable feel to the driver. As a result, it was contemplated to provide two similar modules spaced one above the other in an attempt to eliminate such binding. Such previous design also had the decided disadvantage of cost and requiring constant energization of the coils during the park/locked condition of the shifter.

The object of the present invention is to provide a simplified, lower cost version of a brake/park mechanism for preventing a driver from shifting a shift lever from park position to another gear position unless the brake is applied. Another object is to provide a brake/park/lock mechanism which can be used with the BTSI System of my U.S. Pat. No. 5,096,033 which will permit the shifter lever to be shifted out of the park position only when the brake is applied and the steering lock mechanism is released by actuation of the ignition key.

SUMMARY OF THE INVENTION

The above objects of locking the shifting lever in the park position unless the brake is applied is achieved by providing an electrically operated control module having a movable locking member movable between a locking position and a non-locking position. This control module is controlled by the application or nonapplication of the brakes of the vehicle on which the shifter is mounted. When the brakes are not applied, the locking member is urged to a locked position. When the brakes are applied, the locking member is moved to a unlocked position at which the driver can actuate the pawl from park position to the other gear positions.

In accordance with the broadest concept of my invention, I provide the combination of a locking member and mechanical advantage means for actuating the locking member by a force on said mechanical advantage means in a direction substantially orthogonal to the direction of movement of the locking member. Such combination takes advantage of the lesser force required to move the locking member into locked position and the greater force exerted by the mechanical advantage means in holding the locking member in locked position.

More specifically, one unique mechanical advantage means is a toggle joint means operatively connected between the actuator of the electrical module and the locking member thus utilizing the mechanical advantage of the toggle joint whereby in the locked position of the locking member, the toggle joint is capable of withstanding the inadvertent force a driver might exert on the pawl actuator without applying the vehicle's brakes. One toggle mechanism includes at least two links which are pivotally connected together at one of their ends at a point referred to hereinafter as the knee. At the other ends, one of the links is pivoted about a fixed axis and the other end of the other link is connected to the locking member. When the two links are aligned or nearly aligned with the pivotal connection or knee of the links located on the center line between the pivotal axes of the other ends of the links, a force exerted on the locking member substantially along such center line cannot pivot the two links. However, if the pivotal axis or knee of the two links is moved a sufficient distance off center in one direction, the two links can be pivoted relative to each other. As the distance between such center line and the axis of the knee between the two links increases, the amount of force required to move the pawl actuator decreases.

The present invention takes advantage of the above phenomena by applying a force to the knee between the links toward the center line by a biasing means such as a spring, until the knee reaches the center line or slightly beyond where it abuts against a stop means. At such position, the locking member is immovable until the module actuator, which is movable in response to the coil of the module and is connected to the toggle joint at the pivotal axis or knee between the two links, pulls the knee away from the center line, thus greatly reducing the restraining force of the toggle.

In one embodiment of my invention, the module actuator is connected directly to the knee of the toggle. In this embodiment, the module actuator pulls the toggle joint so as to cause the locking member to move out of or nearly out of the path of the pawl actuator.

In another embodiment, I provide a lost motion connection between the module actuator and the knee of the toggle. In this second embodiment, the biasing means is permitted by the lost motion connection to bend the knee beyond the center line where it abuts a stop member and locks the locking member in locked position. In this embodiment, the knee is pulled at a distance wherein the toggle joint's holding force is sufficiently reduced to permit a force exerted on the pawl actuator by the driver to easily displace the pawl actuator as it cams over the locking member. The distance required for movement of the module actuator is substantially shortened by this modification so as to reduce the magnetic force required by the module.

Also in accordance with this invention, I provide a mechanism for manually moving the locking member to an unlocked position. I accomplish this by providing a push button or other mechanism for exerting a force on the knee of a toggle in a direction toward the coil of the brake module. Thus, the locking member can be moved to the unlocked condition even though the vehicle's electric power may be gone permitting the pawl to move out of the park position to another gear position such as neutral, so as to permit towing of the vehicle.

Having briefly described the physical features of my invention, the following drawings with the more detailed description will serve to explain the concepts and principles of the invention.

BRIEF DESCRIPTION OF THE DRAWINGS

FIG. 3 is an enlarged, cross-sectional, side-elevational view of my invention disclosing in more detail my invention with a locking member in locked position;

FIG. 4 is a cross-sectional, side-elevational, partial view like that of FIG. 3 but disclosing locking member in unlocked position;

DESCRIPTION OF THE PREFERRED EMBODIMENTS

Figure 1:
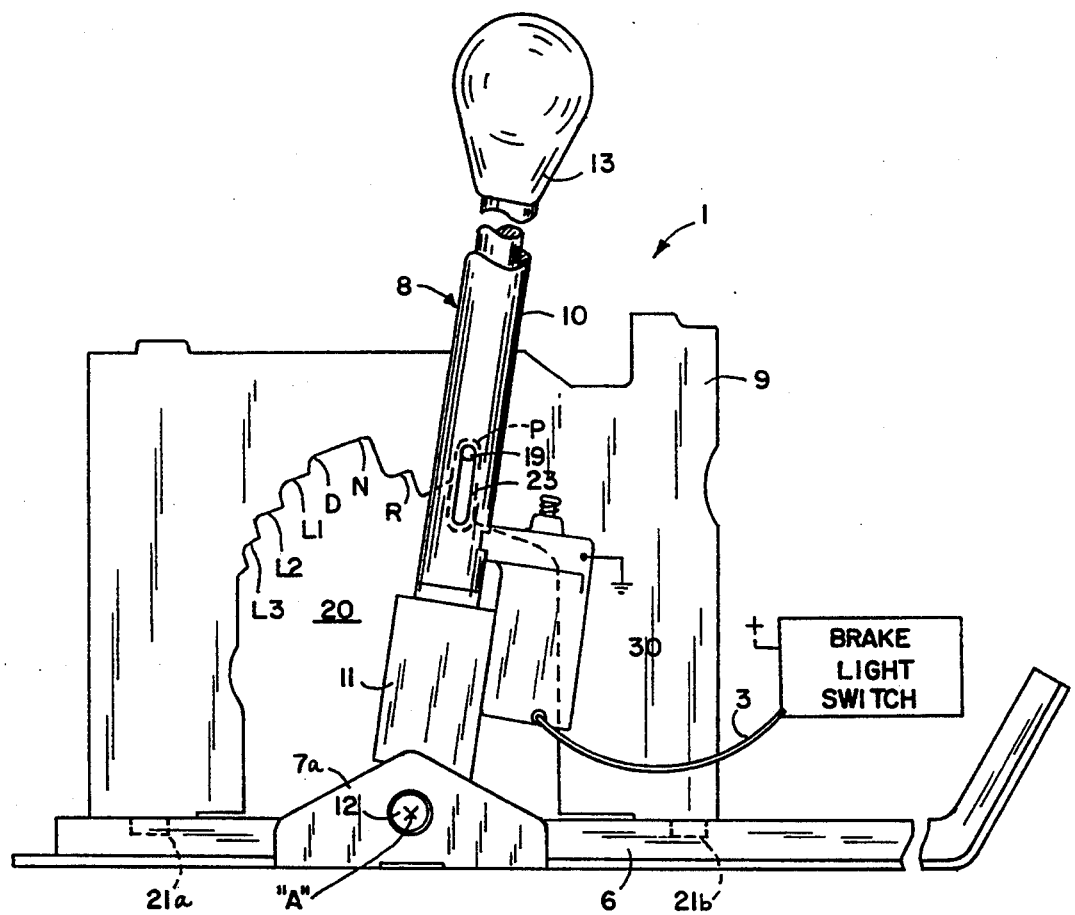
FIG. 1 is a sketchy, side-elevational view of the shifter of this invention without the cable bracket.
Figure 8:
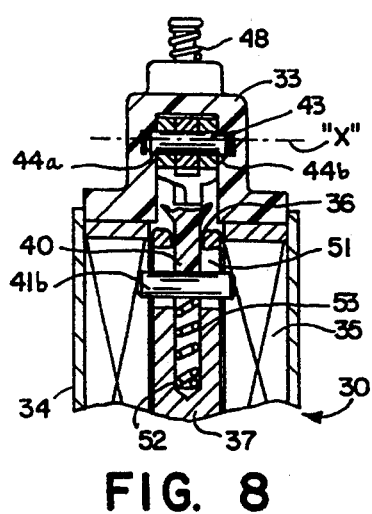
FIG. 8 is a cross-sectional view taken along the plane VIII—VIII of FIG. 7.
Figure 2:
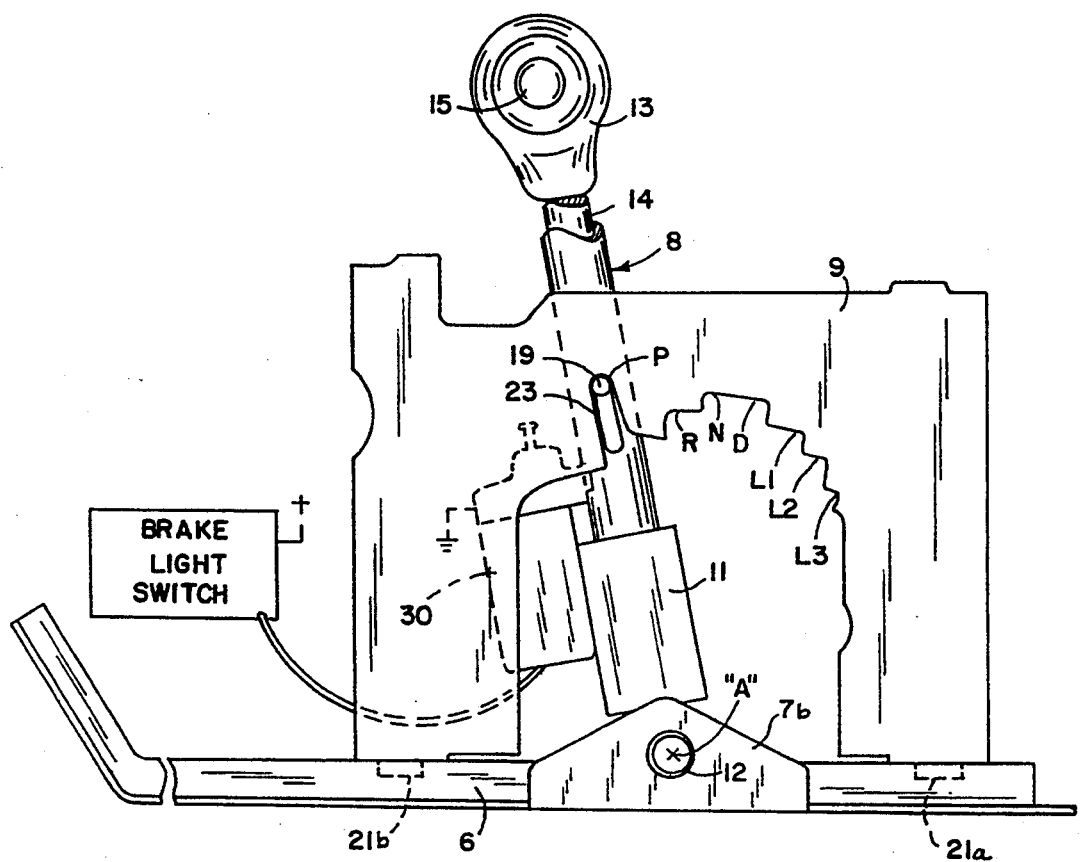
FIG. 2 is another side-elevational view of the shifter of this invention, such view being the reverse side of that shown in FIG. 1.

Referring to the drawings and particularly to FIGS. 1 and 2, reference numeral 1 designates an automatic shifting mechanism for an automotive vehicle operatively connected to a brake light switch by electrical cord 3. It should be understood that this automatic shifting mechanism can be utilized in my systems as disclosed in my U.S. Pat. No. 5,096,033, which is incorporated herein by reference, although it can be used in many different systems wherein a park/lock is to be made responsive to a predetermined condition of a motor vehicle.

Shifting mechanism 1 includes the base 6 having a pair of spaced ears 7a, 7b supporting the shift lever 8 about the axis "A." The base also supports the upright detent plate 9.

Shift lever 8, as disclosed in FIGS. 1-8, is of a conventional type which includes a tube 10 secured at its lower end to the housing 11 which, in turn, is pivoted about the axis A by an axle 12 extending between the two ears 7a and 7b. Housing 11 is pivotally mounted for pivoting the shift lever 8 to different gear positions.

A handle 13 is secured to the top of the tube 10 and provides a housing with means for actuating the pawl actuator 18 which is biased upwardly in the tube 10 by a spring 20 extending upwardly from the housing 11. The means for actuating pawl actuator 18 includes a rod 14 contacting the button 15 slidably mounted within the handle 13. The inclined camming surface 16 of button 15 contacts the inclined cam surface 17 of a rod 14 so that when the button 15 is depressed to overcome the bias of spring 16a, the rod or shaft 14 is forced downwardly. The pawl actuator 18 is located below the rod 14 and supports the pawl 19 which holds the shifting lever 10 in various gear positions as established by the detent plate 9.

The pawl 19 extends through the pawl actuator 18 and extends through the slots 22 and 23 on each side of the tube 10. The pawl is thus movable downwardly through the slots 22 and 23 from the position as disclosed in FIGS. 3 and 6 to the positions of FIGS. 4 and 7, respectively.

Detent plate 9 is an upright plate having tabs 21a and 21b extending through openings in the base 6 and secured in an upright position. Detent plate 20 has a central opening defining a series of notches designated by the letters "P," "R," "N," "D," "L1," "L2," and "L3." It is important that the park notch "P" is deeper than all of the other remaining notches in order that the pawl is prevented from being locked in any other notch than in the park/lock notch. One exception to this is if it is desirable for some reason or another to lock the pawl in the neutral position as well as the park position in which event the depth of the notches in both the park and neutral positions should be the same.

As is well known in the art, shifting the shifting lever 8 so that the pawl 19 can be located in one of the notches will shift the automatic transmission to the designated gear positions. The above-described detent plate 9 and shifting lever 8 including the pawl 19, push button 15, and associated parts are generally well known and conventional. The novel aspect of this invention is the means for locking the pawl 19 in the "park" notch designated by the letter "P."

The simplest structure for locking the locking member or pin in the park/lock position is disclosed in FIGS. 3 and 4 wherein the pin 24, which is the locking member, extends into a notch 25 cut into the side of the pawl actuator 18. Pin 24 has an inclined end surface 27 and notch 25 has an inclined surface 26. These inclined surfaces are provided to minimize binding and also provide a camming action whereby a force applied to pawl actuator 18 will assist in moving pin 24 to unlocked position at appropriate times. The position of the pin 24 is controlled by a module 30 comprising the magnetic actuator 31 operatively connected to a toggle linkage 32, the position of which determines the locked or unlocked position of the pin 24. The module 30 is mounted on the side of the housing 11 and is accordingly movable with the shift lever 8.

The module 30 includes a housing 33 for the toggle linkage 32 and the housing 34 connected to housing 33 and containing the magnetic actuator 31 which includes the coil 35, pole piece 36, armature 37, and bias spring 45. The housing 34 is constructed of magnetic permeable material so as to form a part of the magnetic flux path. Thus, when the coil is energized, the armature 37, herein also called the module actuator, is magnetically attracted to pole piece 36 against the bias of spring 45. Housing 33 is constructed of a structural plastic which houses the upper part of toggle linkage 32 and pin 24. Material which has some lubricity is preferred.

The toggle linkage 32 comprises the three links 38, 39, and 40 all of which are pivotally connected together at one of their ends on the pin 41a about the axis Y. The other end of link 38 is pivoted on the pin 42 about the fixed axis "Z." The other end of link 39 is pivotally mounted by the pivot pin 43 to the locking pin 24 for pivotal movement about the axis "X." The ends of pin 43 are slidable in the grooves 44a and 44b. The other end of link 40 is pivoted by pin 41b to the upper end of the armature 37 to operatively connect armature 37 to the knee of the toggle joint formed by links 38 and 39. As disclosed in FIG. 3, when the locking pin 24 is in locked position within notch 25, the three axes "X," "Y," and "Z" are all substantially aligned, it being understood that axis Y is preferably very slightly spaced downwardly from the center line "CL" toward the armature 37 in order to produce the best results. The reason for this is that as the axis Y moves away from the center line "CL," the amount of the pulling force required to pull the locking pin 24 out of the locked position substantially decreases. The slight spacing of axis "Y" from the center line "CL" is determined by the desired restraining force on pin 24, that being the force required to prevent the driver from displacing the pin 24 toward the unlocked position while the brakes are not applied. In making this determination, it should be taken into account that in accordance with well-known principles of mechanics, the force reduces measurably as the axis "Y" moves down. As a practical measure, the distance can be best determined by trial and error after estimates are determined by well-known formulas for toggle joints.

Operation of First Embodiment

Having described the structure of the first embodiment of my invention, the operation of the same should be evident. Referring to FIGS. 3 and 4, as previously stated, FIG. 3 shows the module 30 in locked position, that is, with the locking member or pin 24 extending into the notch or groove 25 of the pawl actuator 18. In this position, the two links 38 and 39 are essentially aligned with the center line "CL" although, as previously explained, they could be slightly bent downwardly so as to locate the axis "Y" just slightly below the center line "CL." It is important that the axis "Y" be located in either of the two positions. The positions are determined by the bias of spring 45 located in blind opening 46 forcing the armature or module actuator 37 upwardly causing the toggle joint 32 to abut against the stop 47 which is formed on the end of plunger 48. Spring 49 biases plunger 48 upwardly into the position shown and, as will be explained hereinafter, provides a manual means for unlocking pin 34. As previously stated in the position of FIG. 3, the driver is unable to actuate the pawl 19 by depressing the plunger 15.

When the driver applies the brake, the coil 35 is energized causing the armature or module actuator 37 to be drawn downwardly by the magnetic force created by the coil. The armature 37 is thus moved downwardly to the position of FIG. 4 against the pole piece 36. O-ring 59, constructed of an elastomeric material, is provided to provide a noise reduction cushion when the armature 37 reaches the pole piece 36. An elastomeric surface is also provided on the stop member 47 to provide a soft contact. The reason for these two elastomeric elements is to reduce any clicking noise which might result when the mechanism reaches the locked and unlocked positions.

In the event the locking member is to be unlocked manually, the stop plunger 48, which extends through the top of the housing 33, is pushed downwardly against the bias of the spring 45. This breaks the knee between the two links 38 and 39 a sufficient distance so that the driver in applying a force to the button 15 on the handle 13 can cam the pin 24 to the unlocked position of FIG. 4.

It sometimes occurs that the driver will push the button 15 before he applies the braises. This will cause the pawl actuator to exert a force on the pin 24 prior to the time that the coil 35 is energized. This force exerted by the pawl actuator against the pin 24 causes binding of the pin 24 within the opening 50 in which it slides thereby requiring a greater magnetic force than provided by coil 35 to draw the armature 37 downwardly to the unlocked position of the locking member 24. The occurrence of such binding is easily eliminated by the driver releasing the force on the button 15 to erase any binding and continuing to apply the brakes in which event the armature 37 is drawn downwardly to the position of FIG. 4 by the magnetic force created by the coil 35.

DESCRIPTION OF SECOND EMBODIMENT

FIGS. 5–7 and 9 disclose my second embodiment which is very similar to my first embodiment and, therefore, the same reference numerals are used for like elements.

FIGS. 5–7 and 9 disclose one way of minimizing and substantially eliminating the binding effect as above described. This mechanism also eliminates the need of locating the axis "Y" below the center line "CL" and instead permits locating the axis "Y" of the knee of the two links 38 and 39 above the center line "CL" so as to eliminate any possibility for the driver to move the pin 24 out of locking position by depressing the button 15 on the handle 13. As disclosed in FIG. 5, when the pin 24 is in the locked position, the axis "Y" is above the center line "CL" and the link 40 engages the stop member 47. As a result, any force directed along the center line "CL" will cause the knee of the two links 38 and 39 to attempt to break or bend upwardly against the stop 38 absolutely preventing the movement of locking pin 24 out of notch 25.

Figure 5:
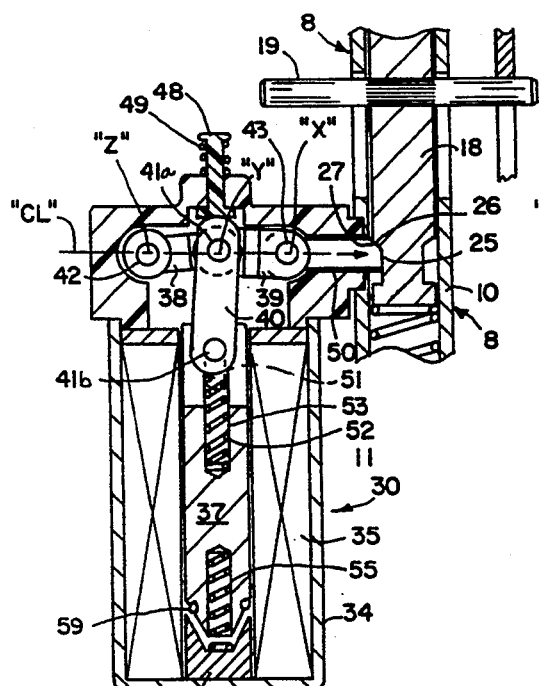
FIG. 5 is a cross-sectional, side-elevational, partial view of a second embodiment of my invention disclosing the locking member in locked position.
Figure 6:
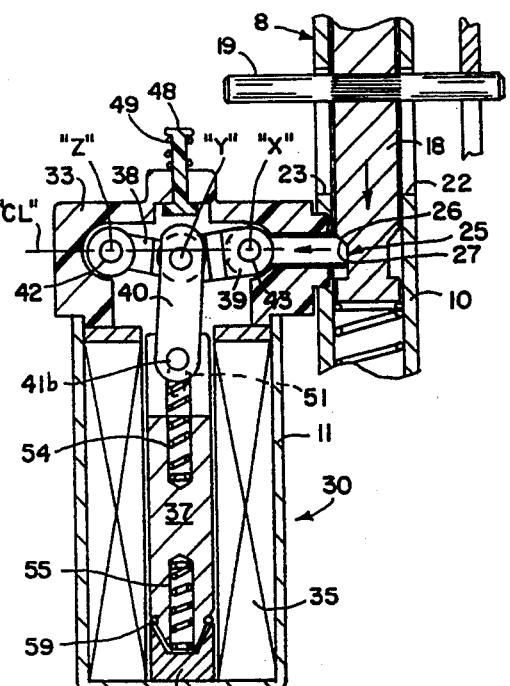
FIG. 6 is a cross-sectional, side-elevational, partial view of the second embodiment of my invention like that of FIG. 5 but disclosing an intermediate stage of operation wherein the locking member can no longer lock the pawl actuator but can be displaced by the pawl actuator by reason of a force exerted on the pawl actuator by a driver.
Figure 9:
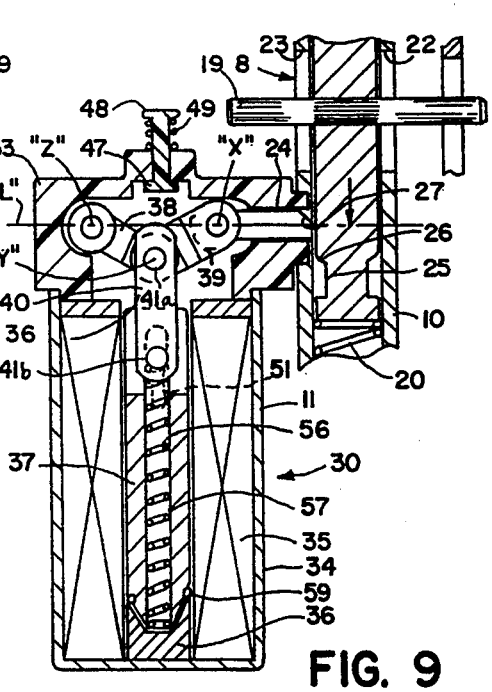
FIG. 9 is a cross-sectional, side-elevational, partial view like that of FIG. 7 but modified to provide a single spring in lieu of the dual spring construction of FIGS. 5, 6, and 7.

The major structural difference between the mechanism of FIGS. 5, 6, and 9 is the spicing between the lower end of armature 37 and the pole piece 36 and the presence of a lost connection between the link 40 and the upper end of the armature or module actuator 37. This combination provides for a strong pull on armature 37 to break the toggle joint 32 to a point where the driver can further break the knee of the toggle joint as permitted by the lost motion connection as the cam locking pin 24 is cammed to an unlocked position. Connecting pin 41b is located in the grooves 51 (FIGS. 5–8) so that it can slide in the grooves 51 from the position disclosed in FIGS. 5 and 6 to the position as disclosed in FIGS. 7 and 8. A coil spring 52 is located in a blind opening 53 and extends upwardly to engage the lower end of link 40 forcing link 40 and pin 41b upwardly into the locked position of FIG. 5. The biasing force of spring 52 is sufficient to hold the toggle joint in the position of FIG. 5 but is sufficiently weak that when the knee of the toggle joint is bent or broken downwardly so that the axis "Y" is below the center line "CL" to the point as disclosed in FIG. 6, a reasonable pressure on the button 15 by the driver will cause the inclined cam surface 27 of pawl actuator 18 to engage inclined surface 26 and force pin 24 in a direction along the center line "CL" to the position of FIG. 7. It should be understood that in accordance with the principles of mechanics, as previously explained, that once the toggle joint of links 34 and 35 has broken downwardly to the extent as viewed in FIG. 6, the force required to move pin 24 along the center line "CL" is substantially less permitting the driver to force the pin 24 out of locking position as disclosed in FIG. 7.

A blind opening 54 is also provided at the lower end of the armature 37, and located in opening 54 is the spring 55 that forces the armature or module actuator 37 upwardly to the position of FIG. 5. In this position, the coil 35 is not energized. It should be noted that the distance between the end of the armature 37 and the pole piece 36 is very short in comparison to the corresponding distance between the armature 37 and pole piece 36 as disclosed in FIG. 3. As a result of this short distance between the spaces of the armature 37, pole piece 36 provides a much greater magnetic force to pull armature 37 downwardly. Thus, it can overcome any binding as above described should the driver apply a force to button 15 of handle 13 prior to applying the brakes. Further, if the driver pushes on the button 15 and then applies the brakes, the toggle joint will bend to the position of FIG. 6 at which position a continued pushing on the button 15 will cam the pin 24 to the position of FIG. 7 without the driver experiencing any feel of binding as might be experienced with the mechanism of FIGS. 3 and 4. Explained in a different way, the larger spacing between the armature 37 and the pole piece 36 of the mechanism of FIGS. 3 and 4 does not produce the same amount of pull on the module actuator or armature 37 as the mechanism of FIGS. 5–7. Therefore, if the binding is too great, by virtue of the driver pushing on the button 15 before applying the brake, the magnetic attraction of the magnetic actuator 30 of FIGS. 3 and 4 may not be sufficient to break the knee of the toggle joint of the links 38 and 39. On the other hand, the mechanism of FIGS. 5–7 produces a greater pull on armature 37 because of the shorter spacing between armature 37 and pole piece 36 to cause breaking of the knee of the toggle joint 32 to the position of FIG. 6. At such position, the restraining force of the toggle joint is sufficiently low to permit the driver, by pushing button 15 on the handle 13, to smoothly and uninterruptedly move the pawl 23 and further break the knee without any feel of any binding. The movement of the knee from the position of FIG. 6 to the position of FIG. 7 is permitted by the lost motion connection, i.e., the sliding of pin 41b in the grooves 51.

Figure 7:
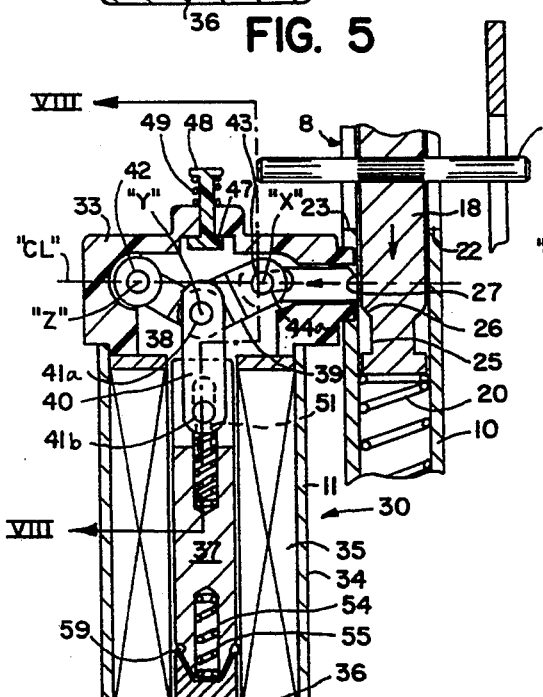
FIG. 7 cross-sectional, side-elevational, partial view like that of FIGS. 5 and 6 disclosing the locking member in the unlocked position and completely out of the path of the pawl actuator.

Having described the operation of the mechanism of FIGS. 3 and 4 and the structural and functional differences between such mechanism and the mechanism of FIGS. 5–7, it is not considered necessary to further describe the operation of the mechanism of FIGS. 5–7.

Description of Modification of Second Embodiment

FIG. 9 discloses a variation of the mechanism of FIGS. 5–7. In this version, a single spring 56 is utilized in lieu of the two springs 52 and 55. Spring 56 is located in a bore 57 extending substantially the entire length of the armature 37, that is, from the lower end of the link 40 to the bottom surface of the pole piece 36. It should be evident that the spring 56 serves the same function as springs 52 and 55 of FIGS. 5–7. The strength of the biasing force of spring 56 should be chosen to perform the two functions of forcing the armature 37 upwardly to the position of FIG. 5 while at the same time permitting the pawl actuator 18 to force the locking pin 24 to an unlocked position once the knee of the toggle joint 32 has been broken to the position of FIG. 6 by energization of the coil 35.

From the foregoing description, it may readily be observed by those skilled in the art that the present invention provides a novel lockout mechanism for an automatic shifter wherein the shifter is locked into park position unless the brake is applied. Those skilled in the art, of course, will appreciate the many advantages of the present invention over that shown in the prior art and will also recognize that many modifications can be made without departing from the concept and spirit of the invention.

The embodiments of the invention in which an exclusive property or privilege is claimed are defined as follows:

1. In a vehicle transmission shifter mechanism for a vehicle having a brake, said vehicle transmission shifter mechanism having a brake/park/lock mechanism for preventing the shifting of said transmission shifter from park position to another gear position unless the brakes of the vehicle are applied;

a shifting lever movable from a park position to at least one other gear position;

a detent plate and detent pawl associated with said shifting lever for releasably holding said lever in said park position;

pawl actuator means for actuating said pawl to release said shifting lever for movement to said other gear position;

an electrically operated control module including a pin movable between a locked position to an unlocked position, said control module being controlled by a driver applying the brakes of the vehicle in which said vehicle transmission shifter mechanism is mounted whereby when the brakes are not applied, said pin is urged to said locked position and when the brakes are applied, said pin is urged to the unlocked position; and said control module including an electrical coil and an actuator member movable in response to energization of said coil, the improvement comprising:

toggle joint means operatively connecting said actuator member to said pin.

2. The shifter of claim 1 in which said toggle joint means includes a first link and a second link, one end of said first link being pivotally connected to one end of said second link providing a knee; the other end of said first link being pivoted about a fixed axis and the other end of said second link being pivotally connected about a movable axis to one end of said pin whereby the positions of said knee correspond to the locked and unlocked positions of said pin; and said actuator member being operatively connected to said first and second links at said knee.

3. The shifter of claim 2 in which said actuator member is connected directly to said knee by a third link.

4. The shifter of claim 2 in which biasing means is provided to bias said knee to a position where said pin is in locked position and the combination of said electrical coil and actuator member is adapted to produce a magnetic force when said coil is energized for breaking said knee permitting said pawl actuator to actuate said pawl to release said shifting lever for movement to said other gear position.

5. The shifter of claim 2 including manual operated means for applying a force to said knee to manually force said pin from said locked position to said unlocked position.

6. The shifter of claim 1 in which the shifting lever is a tube having said pawl actuator slidably extending axially through at least a portion of the inner passageway of said tube; said pin in its locked position extending into said passageway into the path of the pawl actuator.

7. The shifter of claim 2 in which the shifting lever is a tube having said pawl actuator slidably extending axially through at least a portion of the inner passageway of said tube; said pin in its locked position extending into said passageway into the path of the pawl actuator.

8. The shifter of claim 7 in which the toggle mechanism and control module are located in a housing supported on said tube; said housing and said tube having aligned openings to accommodate the movement of said pin in and out of the path of said pawl actuator.

9. The shifter of claim 8 in which said pin extends and is movable substantially perpendicular to the axis of said tube; said actuator member extends substantially perpendicular to the axis of said pin; and said first and second links in the locked position of said pin extend substantially aligned with the axis of said pin and, in the unlocked position of said pin form a "V."

10. The shifter of claim 2 in which said actuator member is operatively connected to said knee by a lost motion correction means permitting said knee to move in a direction toward said actuator member over one side of a center line drawn between said fixed axis and movable axis;

force application means for forcing said knee to a position where said toggle joint means can restrain movement of said pin by a force applied to said pawl actuating means;

said actuator member being adapted to move said knee away frown said center line to a first position between said center line and said actuator member in response to energization of said coil; and said lost connection means permitting said pawl actuator means to move said pin out of locked position and said knee to a second position between said center line and actuator member subsequent to said actuator member moving said knee to said first position.

11. The shifter of claim 9 in which said actuator member is operatively connected to said knee by a lost motion connection means permitting said knee to move in a direction toward said actuator member over one side of a center line drawn between said fixed axis and movable axis;

force application means for forcing said knee to a position where said toggle joint means can restrain movement of said pin by a force applied to said pawl actuating means;

said actuator member being adapted to move said knee away frown said center line to a first position between said center line and said actuator member in response to energization of said coil; and said lost connection means permitting said pawl actuator means to move said pin out of locked position and said knee to a second position between said center line and actuator member subsequent to said actuator member moving said knee to said first position.

12. The shifter of claim 2 in which said actuator member is operatively connected to said knee by a lost motion connection means permitting said knee to move in a direction away from said actuator member over one side of center line drawn between said fixed axis and movable axis;

force application means for forcing said knee to a position over said center line in a direction away from said actuator member when said coil is deenergized;

said actuator member being adapted to move said knee over the other side of said center line in a direction toward said actuator member in response to energization of said coil; and said lost connection means permitting said pawl actuator means to move said pin out of locked position subsequent to said actuator member moving said knee over the other side of said center line.

13. The shifter of claim 9 in which said actuator member is operatively connected to said knee by a lost motion connection means permitting said knee to move in a direction away from said actuator member over one side of said center line drawn between said fixed axis and movable axis;

force application means for forcing said knee to a position over said center line in a direction away from said actuator member when said coil is de-energized;

said actuator member being adapted to move said knee over the other side of said center line in a direction toward said actuator member in response to energization of said coil; and said lost connection means permitting said pawl actuator means to move said pin out of locked position subsequent to said actuator member moving said knee over the other side of said center line.

14. A vehicle transmission shifter for a vehicle having a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

a shifting lever movable from a park position to at least one other gear position;

a detent plate and detent pawl associated with said shifting lever for releasably holding said lever in said park position;

pawl actuator means for actuating said pawl to release said shifting lever for movement to said other gear position;

an electrically operated control module including said locking member movable between a locked position to an unlocked position, said control module being controlled by the first and second condition of the vehicle in which said vehicle transmission shifter is mounted whereby when the vehicle is in the first condition, said locking member is urged to said locked position and when the vehicle is in the second condition, said locking member is urged to the unlocked position; and said control module including an electrical coil and an actuator member movable in response to energization of said coil, the improvement comprising toggle joint means operatively connecting said actuator member to said locking member.

15. The shifter of claim 14 in which said toggle includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

16. The shifter of claim 15 in which said actuator member is connected directly to said knee by a third link.

17. The shifter of claim 15 including manually operated means for applying a force to said knee to manually force said locking member from said locked position to said unlocked position.

18. The shifter of claim 14 in which the shifting lever is a tube having said pawl actuator slidably extending axially through at least a portion of the inner passageway of said tube; said locking member being elongated along an axis and in its locked position extending into said passageway into the path of the pawl actuator.

19. The shifter of claim 15 in which the shifting lever is a tube having said pawl actuator slidably extending axially through at least a portion of the inner passageway of said tube; said locking member being elongated along an axis and in its locked position extending into said passageway into the path of the pawl actuator.

20. The shifter of claim 19 in which the toggle mechanism and control module are located in a housing supported on said tube; said housing and said tube having aligned openings to accommodate the movement of said locking member in and out of the path of said pawl actuator.

21. The shifter of claim 20 in which said locking member extends and is movable substantially perpendicular to the axis of said tube; said actuator member extends substantially perpendicular to the axis of said locking member; and said first and second links in the locked position of said locking member extend substantially aligned with the axis of said locking member and in the unlocked position of said locking member to form a "V."

22. The shifter of claim 15 in which said actuator member is operatively connected to said knee by a lost motion connection means permitting said knee to move in a direction toward said actuator member over one side of a center line drawn between said fixed axis and movable axis;

force application means for forcing said knee to a position where said toggle joint means can restrain movement of said pin by a force applied to said pawl actuating means;

said actuator member being adapted to move said knee away from said center line to a first position between said center line and said actuator member in response to energization of said coil; and said lost connection means permitting said pawl actuator means to move said pin out of locked position and said knee to a second position between said center line and actuator member subsequent to said actuator member moving said knee to said first position.

23. The shifter of claim 21 in which said actuator member is operatively connected to said knee by a lost motion connection means permitting said knee to move in a direction toward said actuator member over one side of a center line drawn between said fixed axis and movable axis;

force application means for forcing said knee to a position where said toggle joint means can restrain movement of said pin by a force applied to said pawl actuating means;

said actuator member being adapted to move said knee away from said center line to a first position between said center line and said actuator member in response to energization of said coil; and said lost connection means permitting said pawl actuator means to move said pin out of locked position and said knee to a second position between said center line and actuator member subsequent to said actuator member moving said knee to said first position.

24. The shifter of claim 15 in which said actuator member is operatively connected to said knee by a lost motion connection means permitting said knee to move in a direction away from said actuator member over one side of said center line drawn between said fixed axis and movable axis;

force application means for forcing said knee to a position over said center line in a direction away from said actuator member when said coil is de-energized;

said actuator member being adapted to move said knee over the other side of said center line in a direction toward said actuator member in response to energization of said coil; and said lost connection means permitting said pawl actuator means to move said locking member out of locked position subsequent to said actuator member moving said knee over the other side of said center line.

25. The shifter of claim 21 in which said actuator member is operatively connected to said knee by a lost motion connection means permitting said knee to move in a direction away from said actuator member over one side of said center line drawn between said fixed axis and movable axis;

force application means for forcing said knee to a position over said center line in a direction away from said actuator member when said coil is de-energized;

said actuator member being adapted to move said knee over the other side of said center line in a direction toward said actuator member in response to energization of said coil; and said lost connection means permitting said pawl actuator means to move said pin out of locked position subsequent to said actuator member moving said knee over the other side of said center line.

26. A vehicle transmission shifter for a vehicle having a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

a shifting lever movable from a park position to at least one other gear position;

a detent plate and detent pawl associated with said shifting lever for releasably holding said lever in said park position;

pawl actuator means for actuating said pawl to release said shifting lever for movement to said other gear position;

an electrically operated control module including said locking member movable along a line between a locked position to an unlocked position, said control module being controlled by the first and second condition of the vehicle in which said vehicle transmission shifter is mounted whereby when the vehicle is in the first condition, said locking member is urged along said line in a first direction to said locked position and when the vehicle is in the second position, said locking member is urged along said line in a second direction opposite to said one direction to the unlocked position; the improvement comprising:

said control module including mechanical advantage means for exerting forces on said locking member along said line in either of said first or second directions; and an actuator member operatively connected to said mechanical advantage means for exerting a force on said mechanical advantage means in a direction orthogonal to said first and second directions, said force exerted by said mechanical advantage means on said locking member along said line is substantially greater than the force exerted by said actuator member on said mechanical advantage means.

27. The vehicle transmission shifter of claim 26 in which said mechanical advantage means includes an elongated mechanism pivotally mounted at one end on a fixed axis located on said line and secured to said locking member at its other end, said other end being movable with said locking member along said line, said elongated mechanism having an intermediate portion movable intermediate said ends in a direction substantially orthogonal to said direction of said line and responsive to the movement of said locking member along said line and vice versa; said actuator member being operatively connected to said intermediate portion for restraining the movement of said locking member when said ends and intermediate portion are substantially aligned and said locking member is in locked position, and for moving said locking member when said intermediate portion is spaced from said line in a direction toward said actuator member and force is applied by said actuator member to said intermediate portion.

28. The vehicle shifter mechanism of claim 26 in which the mechanical advantage means is a toggle joint.

29. The vehicle shifter mechanism of claim 27 in which the mechanical advantage means is a toggle joint.

30. The shifter of claim 28 in which said toggle joint includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

31. The shifter of claim 29 in which said toggle joint includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee corresponds to the locked and unlocked positions of said locking member; and said actuator member being operatively connected to said first and second links at said knee.

32. The shifter of claim 30 in which said actuator member is connected directly to said knee by a third link.

33. The shifter of claim 31 in which said actuator member is connected directly to said knee by a third link.

34. The vehicle shifter mechanism of claim 26 in which the operative connection between said actuator member and said mechanical advantage means is a lost motion connection.

35. The vehicle shifter mechanism of claim 27 in which the operative connection between said actuator member and said mechanical advantage means is a lost motion connection.

36. The vehicle shifter mechanism of claim 30 in which the operative connection between said actuator member and said first and second links is a lost motion connection.

* * * * *

UNITED STATES PATENT AND TRADEMARK OFFICE
CERTIFICATE OF CORRECTION

PATENT NO. : 5,402,870
DATED : April 4, 1995
INVENTOR(S) : Charles Osborn

It is certified that error appears in the above-indentified patent and that said Letters Patent is hereby corrected as shown below:

Column 1, line 37:
    "ill" should be --in--.

Column 1, line 38:
    "all" should be --an--.

Column 3, line 59:
    After "disclosing" insert --the--.

Column 4, line 1:
    After "FIG. 7" insert --is a--.

Column 6, line 49:
    "braises" should be --brakes--.

Column 7, line 18:
    "spicing" should be --spacing--.

Column 10, line 5:
    "correction" should be --connection--.

Column 10, line 14:
    "frown" should be --from--.

UNITED STATES PATENT AND TRADEMARK OFFICE
CERTIFICATE OF CORRECTION

PATENT NO. : 5,402,870
DATED : April 4, 1995
INVENTOR(S) : Charles Osborn

It is certified that error appears in the above-indentified patent and that said Letters Patent is hereby corrected as shown below:

Column 10, line 34:
"frown" should be --from--.

Signed and Sealed this

Nineteenth Day of September, 1995

Attest:

BRUCE LEHMAN

Attesting Officer

Commissioner of Patents and Trademarks